United States Patent
Zhu et al.

(10) Patent No.: US 7,570,594 B2
(45) Date of Patent: Aug. 4, 2009

(54) METHODS, SYSTEMS, AND COMPUTER PROGRAM PRODUCTS FOR MULTI-PATH SHORTEST-PATH-FIRST COMPUTATIONS AND DISTANCE-BASED INTERFACE SELECTION FOR VOIP TRAFFIC

(75) Inventors: Rupert Zhu, Richardson, TX (US); David Z. Lu, Dallas, TX (US); San-qi Li, Plano, TX (US); Edward Y. Qian, Plano, TX (US); Yen Shei, Plano, TX (US)

(73) Assignee: Santera Systems, LLC, Plano, TX (US)

( * ) Notice: Subject to any disclaimer, the term of this patent is extended or adjusted under 35 U.S.C. 154(b) by 0 days.

(21) Appl. No.: 11/545,788

(22) Filed: Oct. 10, 2006

(65) Prior Publication Data

US 2007/0053300 A1    Mar. 8, 2007

Related U.S. Application Data

(63) Continuation-in-part of application No. 10/943,513, filed on Sep. 17, 2004, which is a continuation-in-part of application No. 10/676,233, filed on Oct. 1, 2003.

(60) Provisional application No. 60/526,126, filed on Dec. 1, 2003, provisional application No. 60/551,814, filed on Mar. 10, 2004, provisional application No. 60/748,749, filed on Dec. 9, 2005.

(51) Int. Cl.
*H04J 1/16* (2006.01)
(52) U.S. Cl. ...................... 370/238; 709/241
(58) Field of Classification Search ............. 370/238, 370/254, 235, 230.1, 237; 709/241
See application file for complete search history.

(56) References Cited

U.S. PATENT DOCUMENTS 6,061,348 A    5/2000    Castrigno et al.

(Continued)

OTHER PUBLICATIONS

International Search Report and Written Opinion for International Application No. PCT/US04/31920 (Mar. 4, 2005).

(Continued)

*Primary Examiner*—Ricky Ngo
*Assistant Examiner*—Dady Chery
(74) *Attorney, Agent, or Firm*—Jenkins, Wilson, Taylor & Hunt, P.A.

(57) ABSTRACT

Methods, systems, and computer program products for multipath Shortest-Path-First (SPF) computations and distance-based interface selection for VoIP traffic are disclosed. According to one method, a multi-path router instance associated with a plurality of network interfaces in a source IP device is provided. A cost is assigned to each of a plurality of internal segments between the multi-path router instance and the network interfaces associated with the multi-path router instance. An aggregate cost is calculated for each of a plurality of traffic paths originating at the multi-path router instance in the source IP device and extending through each of the network interfaces associated with the multi-path router instance to a destination IP device in the network. A list of IP paths is generated, and the paths in the list are ranked based on the calculated cost. Traffic is sent from the source IP device over at least one of the paths in the list. The path costs and rankings are updated in response to segment cost changes.

33 Claims, 5 Drawing Sheets

U.S. PATENT DOCUMENTS

| | | | |
|---|---|---|---|
| 6,633,563 | B1 | 10/2003 | Lin et al. |
| 6,674,744 | B1 * | 1/2004 | Doshi et al. .................. 370/352 |
| 6,714,535 | B1 | 3/2004 | Herh |
| 6,771,673 | B1 | 8/2004 | Baum et al. |
| 6,831,895 | B1 * | 12/2004 | Ji et al. ........................ 370/237 |
| 6,831,898 | B1 * | 12/2004 | Edsall et al. ................ 370/256 |
| 6,879,667 | B1 | 4/2005 | Carew et al. |
| 6,956,820 | B2 | 10/2005 | Zhu et al. |
| 7,177,943 | B1 | 2/2007 | Temoshenko et al. |
| 7,185,094 | B2 | 2/2007 | Marquette et al. |
| 7,212,519 | B2 | 5/2007 | Johnson et al. |
| 7,394,818 | B1 * | 7/2008 | Johnson et al. ............. 370/401 |
| 7,424,025 | B2 | 9/2008 | Qian et al. |
| 2002/0006112 | A1 * | 1/2002 | Jaber et al. .................. 370/238 |
| 2002/0012352 | A1 | 1/2002 | Hansson et al. |
| 2002/0016926 | A1 | 2/2002 | Nguyen et al. |
| 2002/0051464 | A1 | 5/2002 | Sin et al. |
| 2002/0191612 | A1 | 12/2002 | Curtis |
| 2003/0093555 | A1 | 5/2003 | Harding-Jones et al. |
| 2003/0099192 | A1 * | 5/2003 | Scott et al. .................. 370/229 |
| 2003/0118039 | A1 | 6/2003 | Nishi et al. |
| 2003/0142795 | A1 | 7/2003 | Gavette et al. |
| 2003/0193898 | A1 * | 10/2003 | Wong et al. .................. 370/252 |
| 2004/0047345 | A1 * | 3/2004 | Joseph et al. ............... 370/352 |
| 2004/0066782 | A1 | 4/2004 | Nassar |
| 2005/0068942 | A1 * | 3/2005 | Chu et al. .................... 370/352 |
| 2005/0073998 | A1 | 4/2005 | Zhu et al. |
| 2007/0064613 | A1 | 3/2007 | Qian et al. |
| 2007/0083528 | A1 | 4/2007 | Matthews et al. |

OTHER PUBLICATIONS

International Search Report and Written Opinion for International Application No. PCT/US04/31918 (Feb. 11, 2005).

Yoo et al., "A Media Stream Processing of VoIP Media Gateway," IEEE, pp. 91-94 (2003).

Non-Final Office Action for U.S. Appl. No. 10/943,513, filed Aug. 11, 2008.

Non-Final Office Action for U.S. Appl. No. 10/943,513, filed Nov. 26, 2007.

Restriction/Election Requirement for U.S. Appl. No. 11/594,568 (Nov. 26, 2008).

Notification of Transmittal of the International Search Report and the Written Opinion of the International Searching Authority, of the Declaration for International Application No. PCT/US04/32232 (Jun. 2, 2008).

Notice of Allowance and Fee(s) Due for U.S. Appl. No. 10/676,233 (May 2, 2008).

Official Action for U.S. Appl. No. 10/676,233 (Nov. 28, 2007).

Interview Summary for U.S. Appl. No. 10/676,233 (Aug. 22, 2007).

Official Action for U.S. Appl. No. 10/676,233 (Jun. 11, 2007).

Notification of European Publication Number and Information on the Application of Article 67(3) EPC for European Application No. 04789215.3 (May 24, 2006).

Notification of European Publication Number and Information on the Application of Article 67(3) EPC for European Application No. 04789383.9 (May 17, 2006).

Notification of European Publication Number and Information on the Application of Article 67(3) EPC for European Application No. 04789213.8 (May 17, 2006).

Supplemental Notice of Allowability for U.S. Appl. No. 10/943,275 (Sep. 9, 2005).

Notice of Allowance and Fee(s) Due for U.S. Appl. No. 10/943,275 (Feb. 11, 2005).

* cited by examiner

Network Segment Cost Table

| Segment | Cost | Segment | Cost |
|---|---|---|---|
| 212 | 5 | 218 | 12 |
| 214 | 10 | 220 | 3 |
| 216 | 8 | 222 | 18 |

Network Segment Cost Table

| Segment | Cost | Segment | Cost |
|---|---|---|---|
| 316 | 50 | 326 | 23 |
| 318 | 64 | 328 | 58 |
| 320 | 39 | 330 | 28 |
| 322 | 70 | 332 | 35 |
| 324 | 83 | 334 | 18 |

US 7,570,594 B2

METHODS, SYSTEMS, AND COMPUTER PROGRAM PRODUCTS FOR MULTI-PATH SHORTEST-PATH-FIRST COMPUTATIONS AND DISTANCE-BASED INTERFACE SELECTION FOR VOIP TRAFFIC

RELATED APPLICATIONS

This application is a continuation-in-part of U.S. patent application Ser. No. 10/943,513 filed Sep. 17, 2004 (pending), which is a continuation-in-part of U.S. patent application Ser. No. 10/676,233, filed Oct. 1, 2003 (pending), and which claims the benefit of U.S. Provisional Patent Application Ser. No. 60/526,126 filed Dec. 1, 2003 and U.S. Provisional Patent Application Ser. No. 60/551,814 filed Mar. 10, 2004.

This application claims the benefit of U.S. Provisional Patent Application Ser. No. 60/748,749 filed Dec. 9, 2005.

This application is related to U.S. patent application Ser. No. 10/943,275 filed Sep. 17, 2004 (now U.S. Pat. No. 6,956,820).

The disclosure of each of the above-referenced documents is incorporated herein by reference in its entirety.

TECHNICAL FIELD

The subject matter described herein relates to providing voice over IP (VoIP) traffic engineering and path resilience. More particularly, the subject matter described herein relates to methods, systems, and computer program products for multi-path shortest-path-first (SPF) computations and distance-based interface selection for VoIP traffic.

BACKGROUND

IP routing protocols use SPF methods to compute and select the shortest path to a network destination. IP routing protocols that use SPF methods have conventionally implemented path cost calculations assuming that each network device is a single node. In these networks, all potential paths between the source and destination IP devices are identified through network topology information provided by network devices through link state advertisement (LSA) or similar status messages. Costs are assigned to each network segment by a network administrator to reflect relative geographic distance, equipment cost, or other network attributes as deemed appropriate by the administrator. Conventionally, assigned cost values are constrained to be zero or positive, and cost metrics have relative meaning only.

One SPF algorithm conventionally calculates an aggregate sum of the network segment costs for each of a set of pre-defined paths from a source IP device to a destination IP device, and the path with the lowest cost is selected by the source IP device for data transfers. Multiple paths having the same aggregate cost may be utilized by the source IP device in a load-sharing configuration where the total data traffic is distributed across all paths. The path lists generated by conventional SPF calculations do not permit an IP device to autonomously identify alternate paths to a destination IP device for the purposes of either distributing data traffic for load-balancing or for redirecting traffic under a segment or IP device failure in the data network. If an IP device experiences traffic load demands beyond the capacity of the preferred path identified by the SPF calculation, the excess traffic is discarded. Likewise, if a network node or segment in the lowest cost path fails, the IP device cannot autonomously redirect its data traffic. Until new path definitions are provided by other network nodes through link state advertisement messages, data traffic flows are interrupted and requests for establishment of new VoIP call connections are rejected due to blockage.

One published protocol commonly used in public data networks, called Open Shortest Path First (OSPF), utilizes the basic SPF algorithm and methods. OSPF is defined to support general purpose unidirectional data traffic, such as file or webpage retrieval from a remote server. However, the OSPF definitions do not include methods to pre-assign alternate paths, nor do they include methods for data traffic recovery under node or segment failures along the preferred path. Similarly, the OSPF definitions do not include methods to constrain data traffic assignment among a group of equal low-cost paths in a load-balancing application.

OSPF has been extended to support modified segment cost definitions to support real-time traffic. This modified algorithm, called Traffic Engineering OSPF (TE-OSPF), continues to utilize the fundamental SPF calculation method. Applications that require interactive or low-latency data transfers between two IP devices, such as VoIP or interactive video services, typically have predefined levels of service quality to meet. These service quality levels are conventionally defined in terms of data throughput rates, maximum path delay, and percent availability, and these levels are commonly defined such that the service cannot tolerate data flow interruptions. However, the TE-OSPF definitions, like the OSPF definitions, do not support definitions of pre-assigned alternate paths for rapid network failure recovery or provide mechanisms to constrain load balancing among multiple lowest-cost paths. Systems supporting low-latency or interactive data traffic are consequently limited in their ability to implement the functions often required to support the defined service quality levels.

Accordingly, in light of these difficulties associated with obtaining a ranked list of paths to a destination IP device across a data network based on path costs, there exists a need for improved methods, systems, and computer program products for multi-path SPF computations and distance-based interface selection for VoIP traffic.

SUMMARY

Methods, systems, and computer program products for multipath Shortest-Path-First (SPF) computations and distance-based interface selection for VoIP traffic are disclosed. According to one method, a multi-path router instance associated with a plurality of network interfaces in a source IP device is provided. A cost is assigned to each of a plurality of internal segments between the multi-path router instance and the network interfaces associated with the multi-path router instance. An aggregate cost is calculated for each of a plurality of traffic paths originating at the multi-path router instance in the source IP device and extending through each of the network interfaces associated with the multi-path router instance to a destination IP device in the network. A list of IP paths is generated, and the paths in the list are ranked based on the calculated cost. Traffic is sent from the source IP device over at least one of the paths in the list. The path costs and rankings are updated in response to segment cost changes.

As used herein, the term "IP device" refers to any system that has at least one interface to a data network, supports conventional data network routing protocols, and accepts data traffic in conventional formats. An IP device may be a conventional router or it may be a conventional endpoint, such as a media gateway or a server. The term "source IP device" refers to an IP device serving as the origin of data traffic to be carried across the data network. The term "destination IP device" refers to an IP device serving as the destination or termination point in the data network for the data traffic. The term "node" refers to any system in the data network that is capable of routing data traffic and supporting SPF cost assignments and calculations. The term "segment" refers to a physical connection between adjacent network nodes. The terms "data path" or "path" refers to a defined set of segments and nodes that jointly provide a connection across a data network between an IP device sourcing data traffic and an IP device sinking or terminating data traffic.

The subject matter described herein for multi-path SPF computations and distance-based interface selection for VoIP traffic may be implemented using a computer program product comprising computer executable instructions embodied in a computer-readable medium. Exemplary computer-readable media suitable for implementing the subject matter described herein include chip memory devices, disk memory devices, programmable logic devices and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

In view of the problems described above with respect to obtaining a ranked list of paths from a source IP device to a destination IP device across a data network using SPF calculations, the subject matter described herein provides a method to obtain a ranked list of paths to a destination IP device across a data network based on path costs.

Figure 1:
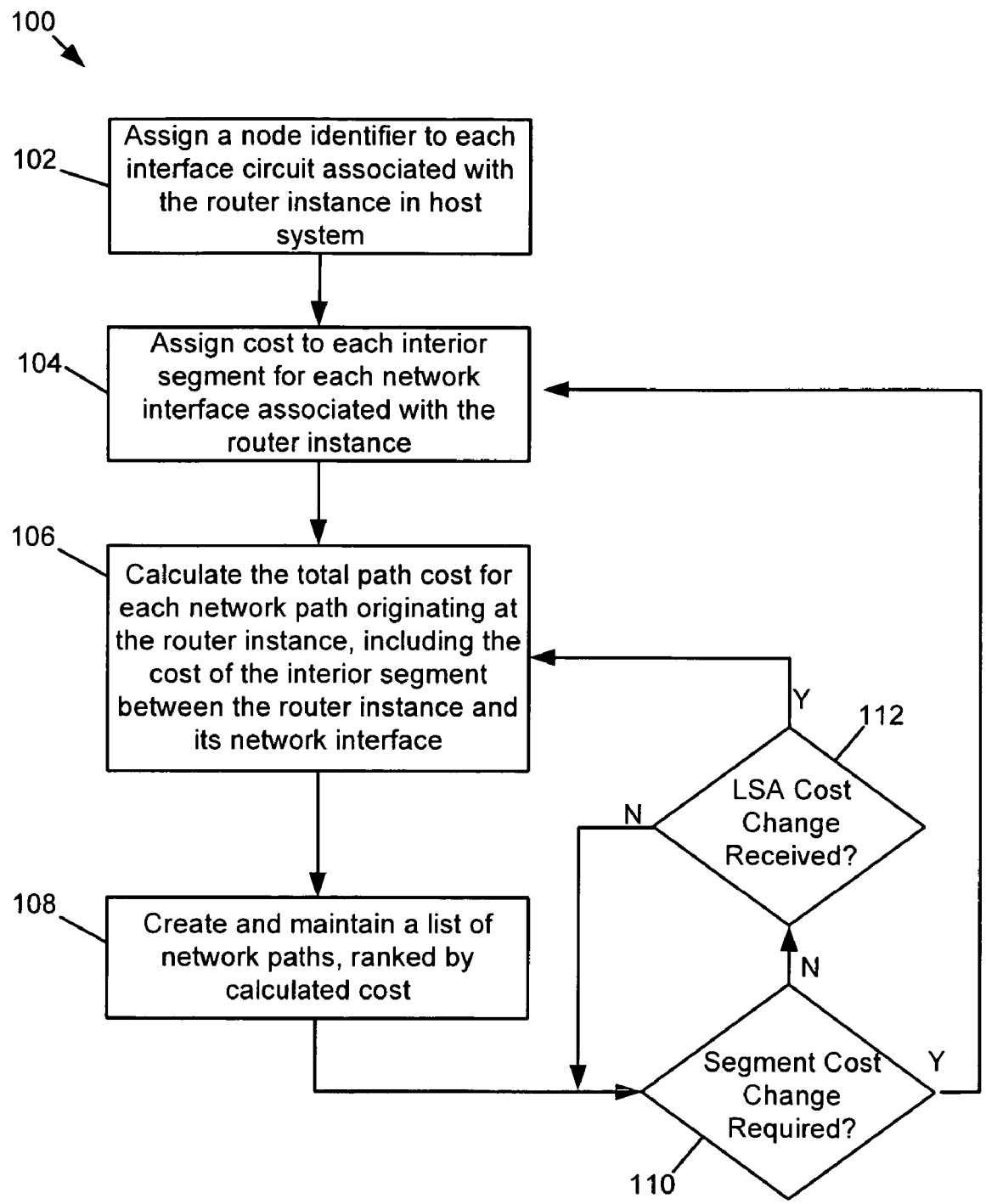
FIG. 1 is a flow chart of an exemplary process for obtaining a ranked list of paths from a source IP device to a destination IP device across a data network using a SPF calculation according to an embodiment of the subject matter described herein.

FIG. 1 illustrates an exemplary process 100 for obtaining a ranked list of paths from a source IP device to a destination IP device across a data network. This process may be implemented by at least one multi-path router instance in an IP device having a plurality of network interfaces. The multi-path router instance may utilize a published routing protocol based on SPF algorithms, such as OSPF or TE-OSPF. The multi-path router instance may execute the SPF algorithm multiple times to obtain multiple paths to a destination through the network interfaces.

In FIG. 1, at block 102 the multi-path router instance in an IP device may assign a SPF node identifier to each of a plurality of network interfaces under its control. This node identifier may be of any format meaningful to the host IP device and the multi-path router instance.

At block 104, the multi-path router instance may assign a cost to the segment between each network interface and the IP device resource hosting the multi-path router instance. This cost may be defined by the multi-path router instance, or it may be assigned by the host system. For example, if a diagnostic task running on the IP device determines that a network interface requires maintenance, the IP device may present a request to the multi-path router instance to change the cost for the segment between the multi-path router instance and the network interface. This permits the multi-path router instance to gracefully shift data traffic from the network interface before the diagnostic task disables the interface for maintenance operations. Once the system diagnostic has completed its work on the network interface, the IP device may then provide a request to the multi-path router instance to return the segment cost to its original value in order to re-enable data traffic on that interface.

Once the interior segment costs have been assigned, the multi-path router instance in the IP device may advertise these costs to adjacent SPF network nodes. For example, an IP device with multiple network interfaces to an adjacent network router may advertise the interior segment costs in order to assist the router with data path selection for traffic terminating at the IP device. These costs may be transmitted to the adjacent network node(s) using conventional link state advertisement (LSA) messages.

At block 106, the SPF may calculate the total path cost for each network path originating at the multi-path router instance. The assigned and available network paths may be maintained in a link state database (LSDB) created and maintained by the multi-path router instance based on network topology information received from neighboring IP devices. The network path calculations may start at the network interface, using the cost assigned to the interior segment at block 106 as the first cost in the summation.

At block 108, the multi-path router instance may create and maintain a list of all available network paths to IP destinations to which the host IP device has traffic flow assignments. This list may be ranked in order of calculated path cost, with the most preferred path to a destination IP device being the path with lowest aggregate cost. This list may be maintained by the multi-path router instance separate from the LSDB in order to ensure that the multi-path router instance has the opportunity to filter incoming LSA messages from adjacent network nodes for applicable network topology definition changes before recalculating and potentially changing the ranks of the network path definitions.

The multi-path router instance may also analyze the ranked path list before enabling data traffic on the preferred path. For example, the multi-path router instance may define the preferred path(s) as being the path(s) having the lowest aggregate cost. The multi-path router instance may also cross-check the definition of the preferred path(s) against the contents of the LSDB to ensure that the defined preferred path(s) are available for use. In the even that the methods at block 108 identify multiple paths with the same preferred cost, the multi-path router instance may further constrain assignment of data traffic along those paths in order to achieve a level of performance desired by an application.

At decision point 110, the multi-path router instance may query the host IP device to determine if changes to the interior segment cost assignments are required. The host IP device may need to modify these assignments for a variety of reasons, including system maintenance operations or network interface reconfiguration requirements. If a change to segment costs is required, the multi-path router instance may implement the change and then transition to block 104 in order to recalculate all network path costs and generate new path rank lists. If no change is required, the process may proceed to decision point 112.

At decision point 112, the multi-path router instance may receive at least one LSA message from adjacent nodes to analyze for any network topology or network segment cost changes. Each LSA message may have a format defined for conventional SPF protocols including OSPF or TE-OSPF. If the multi-path router instance determines that a network topology change has occurred that impacts its LSDB, the multi-path router instance may update its LSDB and the process may transition to block 106 in order to recalculate all network path costs. If the LSA message does not provide updated network topology information, the process may transition to decision point 110 to monitor for any interior segment changes required by the host IP device.

Exemplary IP Device with Single Multi-Path Router Instance

Figure 2:
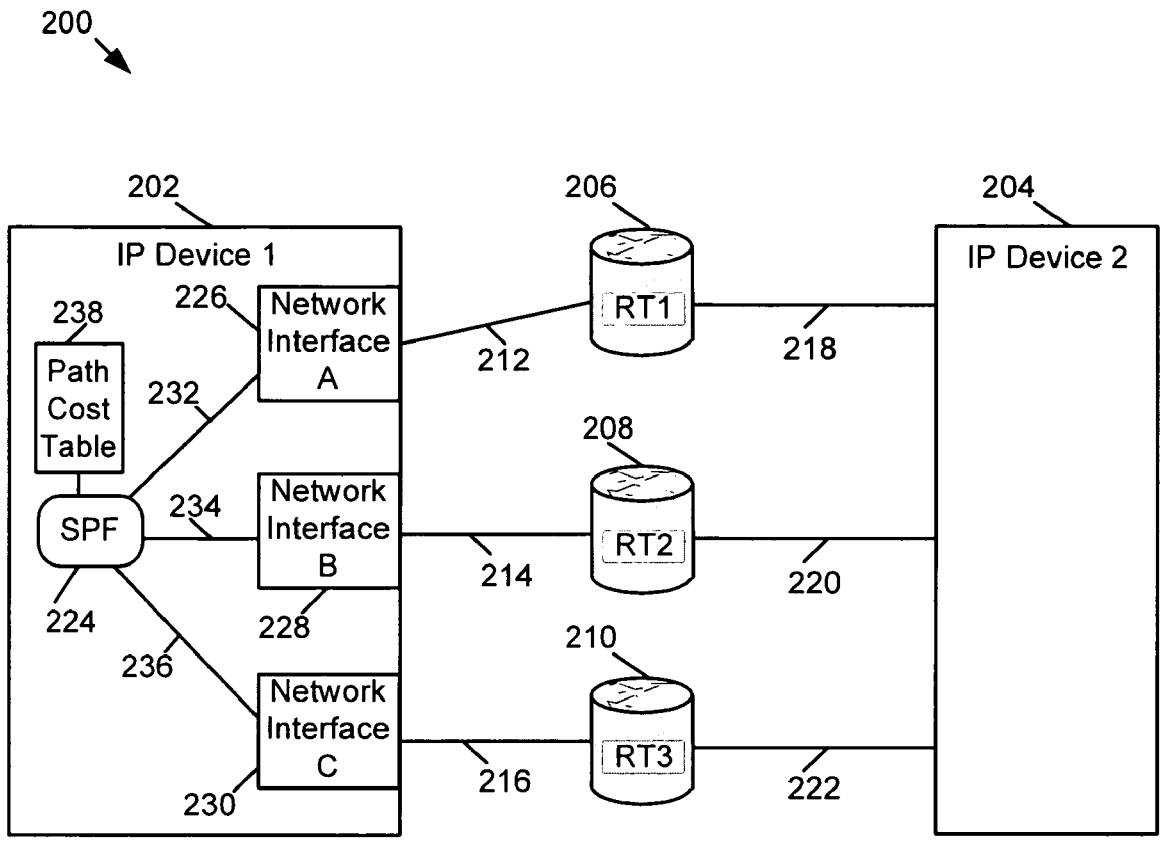
FIG. 2 is a block diagram of an exemplary data network containing an IP device with one multi-path router instance, a conventional IP device, and multiple data network segments and nodes between the two devices according to an embodiment of the subject matter described herein.

In one implementation, an IP device, such as a media gateway, may include a single multi-path router instance that executes a path cost calculation algorithm, multiple times to calculate path costs to a destination through a plurality of network interface in the IP device. FIG. 2 illustrates an exemplary data network 200 with an IP device 202 having plural network interface and a single multi-path router instance according to an embodiment of the subject matter described herein, a conventional IP device 204, multiple network routers 206, 208, and 210, and a plurality of network segments 212, 214, 216, 218, 220, and 222. IP device 1 202, IP device 2 204, as well as routers RT1 206, RT2 208, and RT3 210 may all configured with instances of a SPF algorithm such as OSPF or TE-OSPF. For example, data network 200 may be present in a campus or customer premise gateway application to provide access to the public Internet.

In FIG. 2, IP device 1 202 may further include a multi-path router instance 224, multiple network interfaces 226, 228, and 230, multiple interior segments 232, 234, and 236, and a path cost table 238. IP device 2 204 may be a conventional IP device serving as an end node in data network 200.

IP device 1 202 and IP device 2 204 may define application data traffic flows using conventional data communication protocol methods including IP source and destination addresses, TCP or UDP addresses, and Real-Time Transport Protocol (RTP) addresses used for VoIP traffic. IP device 1 202, IP device 2 204, RT1 206, RT2 208, and RT3 210 may each maintain network topology information in a LSDB and may update their respective LSDBs upon receipt of LSAs as defined according to conventional implementations of the SPF protocol.

IP device 1 202 may assign SPF node identities to network interface A 226, network interface B 228, and network interface C 230. IP device 1 302 or the operator of IP device 1 202 may assign SPF costs to interior segments 232, 234, and 236. These costs may be defined by system management resources within IP device 1 through interaction with multi-path router instance 224, and may be keyed to constrain data traffic flows through specific network interfaces within IP device 1 202. Once assigned, these costs may also be advertised to adjacent network devices RT1 206, RT2 208, and RT3 210 using conventional LSA messages. The network path definitions and associated path costs to each destination IP device may also be stored by multi-path router instance 224 in the path cost table 238.

In an exemplary application, a network administrator may assign the following costs to data network segments 212, 214, 216, 218, 220, and 222, as indicated in FIG. 2, using methods associated with conventional SPF protocols:

Cost(212)=5; Cost(214)=10; Cost(216)=8;
Cost(218)=12; Cost(220)=3; Cost(222)=18

Multi-path router instance 224 may then derive three parallel network path definitions and cost models costs to destination IP device 2 204 as follows:

Path A: network interface A 226::RT1 206::IP device 2 204
Path B: network interface B 228::RT2 208::IP device 2 204
Path C: network interface C 230::RT3 210::IP device 2 204

$$\text{Cost (Path } A) = \text{Cost}(232) + \text{Cost}(212) + \text{Cost}(218)$$
$$= \text{Cost}(232) + 5 + 12$$
$$= \underline{\text{Cost}(232) + 17}$$

$$\text{Cost (Path } B) = \text{Cost}(234) + \text{Cost}(214) + \text{Cost}(220)$$
$$= \text{Cost}(234) + 10 + 3$$
$$= \underline{\text{Cost}(234) + 13}$$

$$\text{Cost (Path } C) = \text{Cost}(236) + \text{Cost}(216) + \text{Cost}(222)$$
$$= \text{Cost}(236) + 8 + 18$$
$$= \underline{\text{Cost}(236) + 26}$$

In a second exemplary application with the above exemplary network segment costs, multi-path router instance 224 may set costs for interior segments 232, 234, and 236 so that all three network paths between multi-path router instance 224 and IP device 2 204 have equal cost. This configuration may permit IP device 1 202 to distribute the aggregate data traffic destined for IP device 2 204 among the three paths in a load sharing configuration. In order to achieve this configuration, multi-path router instance 224 may assign the following values to the interior segment cost parameters:

Cost(232)=9; Cost (Path A)=26
Cost(234)=13; Cost (Path B)=26
Cost(236)=0; Cost (Path C)=26

In a third exemplary application of with the above exemplary network segment costs, multi-path router instance 224 may be required by other resources within IP device 1 202 to establish a prioritized rank of network interface or path utilization without changing assigned costs for external data network segments 212, 214, 216, 218, 220, and 222. For example, an autonomous system management function within IP device 1 202 (not shown) may determine that network interface C 230 has become overloaded and can no longer carry the same level of traffic as before. Multi-path router instance 224 may assign the following cost parameters in order to favor use of network interface A 226 first, followed by network interface B 228, and then reserve network interface C 230 for sparing or overflow traffic only:

Cost (232)=20; Cost (Path A)=37
Cost (234)=35; Cost (Path B)=48
Cost (236)=100; Cost (Path C)=126

Exemplary IP Device with Plural Multi-Path Router Instances

Figure 3:
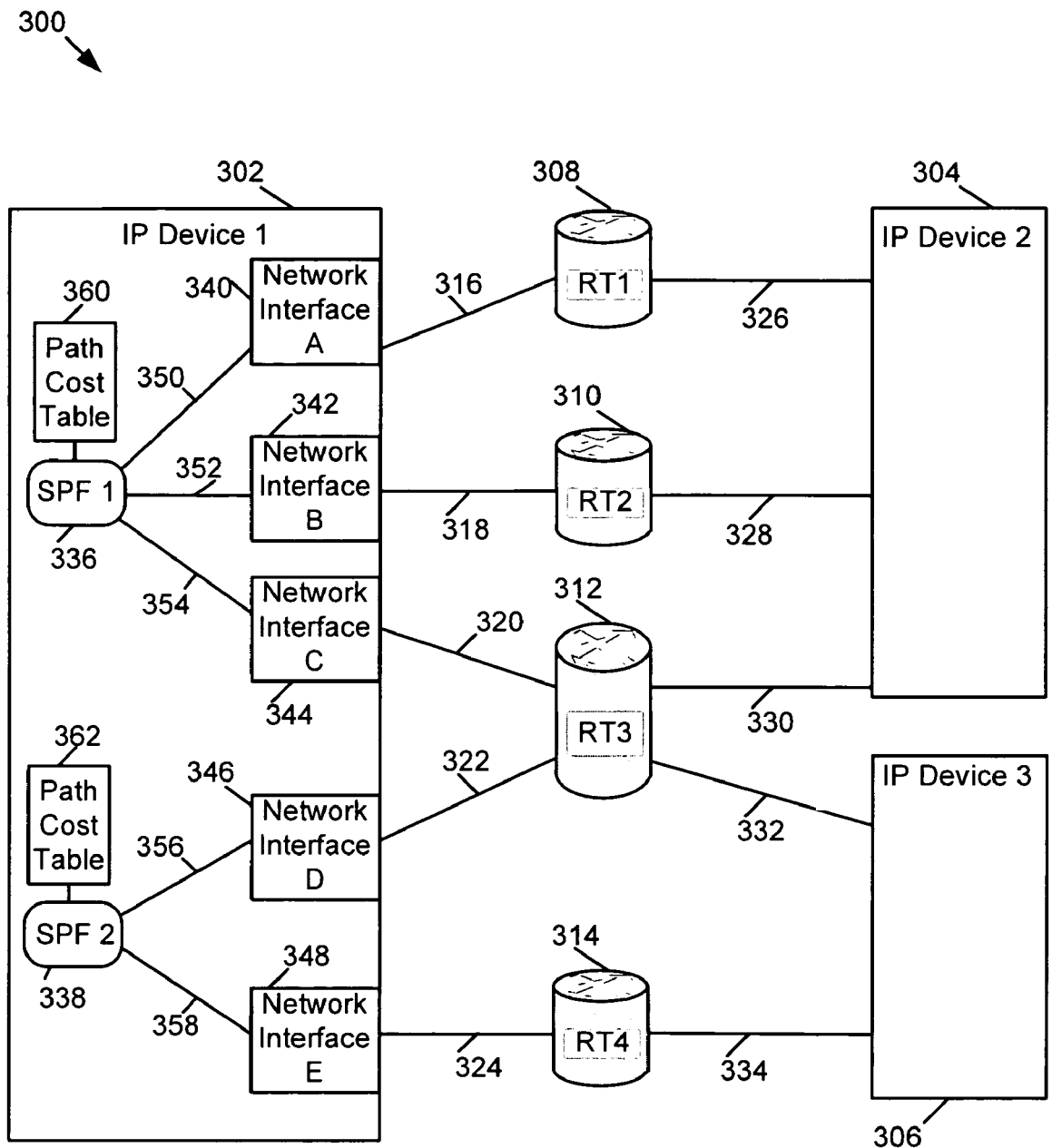
FIG. 3 is a block diagram of an exemplary data network containing an IP device with two multi-path router instances, two conventional IP devices, and multiple data network segments and nodes between the two devices according to an embodiment of the subject matter described herein.

In the example illustrated in FIG. 2, IP device 202 includes a single multi-path router instance 224. In an alternate implementation, an IP device, such as a media gateway, may include plural multi-path router instances, at least one of which executes a path cost calculation algorithm multiple times to calculate path costs to a destination through a plurality of network interface in the IP device. FIG. 3 illustrates an exemplary data network 300 with an IP device 302 having plural multi-path router instances according to an embodiment of the subject matter described herein, two conventional IP devices 304 and 306, a plurality of network devices 308, 310, 312, and 314, and a plurality of network segments 316, 318, 320, 322, 324, 326, 328, 330, 332, and 334. IP device 1 302, IP device 2 304, IP device 3 306, as well as routers RT1 308, RT2 310, RT3 312, and RT4 314 may be configured with instances of a SPF algorithm such as OSPF or TE-OSPF. For example, data network 300 may be a VoIP network to provide IP telephony service to VoIP subscribers.

In FIG. 3, IP device 1 may include two multi-path router instances 336 and 338, five network interfaces 340, 342, 344, 346, and 348, five interior segments 350, 352, 354, 356, and 358, and path cost tables 360 and 362. IP device 2 304 and IP device 306 may be conventional IP devices serving as end nodes in data network 300.

IP device 1 302, IP device 2 304, and IP device 306 may define application data traffic flows using conventional data communication protocol methods including IP source and destination addresses, TCP or UDP addresses, and RTP addresses for VoIP traffic. IP device 1 302, IP device 2 304, IP device 3 306, RT1 308, RT2 310, RT3 312, and RT4 314 may each maintain network topology information in a LSDB and may update their respective LSDBs upon receipt of LSAs as defined according to conventional implementations of the SPF protocol.

IP device 1 302 may assign SPF node identities to network interface A 340, network interface B 342, network interface C 344, network interface D 346, network interface E 348. IP device 1 302 or the operator of IP device 1 302 may assign SPF costs to interior segments 350, 352, 354, 356, and 358. These costs may be defined by system management resources within IP device 1 302 through interaction with multi-path router instances SPF 1 336 and SPF 2 338, and may be keyed to constrain data traffic flows through specific network interfaces within IP device 1 302. Once assigned, these costs may be advertised to adjacent network devices RT1 308, RT2 310, RT3 312, and RT4 314 using conventional LSA messages. Multi-path router instance 1 336 may maintain a LSDB and path calculations for network interface A 340, network interface B 342, and network interface C 344, and may store its network path definitions and associated path costs to each destination IP device in the path cost table 360. Multi-path router instance 2 338 may maintain a LSDB and path calculations for network interface D 346 and network interface E 348, and may store its network path definitions associated path costs to each destination IP device in the path table 362. IP device 1 302 may collect the LSDB and path calculation information from multi-path router instance 1 336 and multi-path router instance 2 338 and create a combined LSDB and path table for the overall device.

In an exemplary application, a network administrator may assign the following costs to data network segments 316, 318, 320, 322, 324, 326, 328, 330, 332, and 334, as indicated in FIG. 3, using methods associated with conventional SPF protocols:
Cost(316)=50; Cost(318)=64; Cost(320)=39;
Cost(322)=70; Cost(324)=83; Cost(326)=23;
Cost(328)=58; Cost(330)=28; Cost(332)=35;
Cost(334)=18;

Multi-path router instance 1 336 may derive three parallel network path definitions and costs to destination IP device 2 304 as follows:
Path A: network interface A 340::RT1 308::IP device 2 304
Path B: network interface B 342::RT2 310::IP device 2 304
Path C: network interface C 344::RT3 312::IP device 2 304

$$\text{Cost (Path } A) = \text{Cost}(350) + \text{Cost}(316) + \text{Cost}(326)$$
$$= \text{Cost}(350) + 50 + 23$$
$$= \underline{\text{Cost}(350) + 73}$$

$$\text{Cost (Path } B) = \text{Cost}(352) + \text{Cost}(318) + \text{Cost}(328)$$
$$= \text{Cost}(352) + 64 + 58$$
$$= \underline{\text{Cost}(352) + 122}$$

$$\text{Cost (Path } C) = \text{Cost}(354) + \text{Cost}(320) + \text{Cost}(330)$$
$$= \text{Cost}(354) + 39 + 28$$
$$= \underline{\text{Cost}(354) + 67}$$

Multi-path router instance 1 336 may also derive a single, non-redundant network path definition and cost model to destination IP device 3 306 using conventional SPF protocols as follows:
Path D: network interface C 344::RT3 312::IP device 3 306

$$\text{Cost (Path } D) = \text{Cost}(354) + \text{Cost}(320) + \text{Cost}(332)$$
$$= \text{Cost}(354) + 39 + 35$$
$$= \underline{\text{Cost}(354) + 74}$$

Multi-path router instance 2 338 may derive two parallel network path definitions and cost models to destination IP device 3 306 as follows:
Path E: network interface D 346::RT3 312::IP device 2 306
Path F: network interface E 348::RT4 314::IP device 2 306

$$\text{Cost (Path } E) = \text{Cost}(356) + \text{Cost}(322) + \text{Cost}(332)$$
$$= \text{Cost}(356) + 70 + 35$$
$$= \underline{\text{Cost}(356) + 105}$$

$$\text{Cost (Path } F) = \text{Cost}(358) + \text{Cost}(324) + \text{Cost}(334)$$
$$= \text{Cost}(358) + 83 + 18$$
$$= \underline{\text{Cost}(358) + 101}$$

Multi-path router instance 2 338 may also derive a single, non-redundant network path definition and cost model to destination IP device 2 304 using conventional SPF protocols as follows:

Path G: network interface D 346::RT3 312::IP device 2 304

$$\text{Cost (Path } G) = \text{Cost}(356) + \text{Cost}(322) + \text{Cost}(330)$$
$$= \text{Cost}(356) + 70 + 28$$
$$= \underline{\text{Cost}(356) + 98}$$

In a second exemplary application of IP device 1 302 in data network 300 with the above network segment costs, SPF 1 instance 336 may set costs for interior segments 350, 352, and 354 such that Paths A, B, and C have the same aggregate cost. This may be desired by application resources in IP device 1 302 in order to provide load balancing across multiple network paths for data traffic between IP applications associated with SPF 1 336 and IP device 2 304. In order to achieve this goal, the assigned costs may be as follows:

Cost(350)=49; Cost(Path A)=122

Cost(352)=0; Cost(Path B)=122

Cost(354)=55; Cost(Path C)=122 and Cost(Path D)=129

In a third exemplary application of IP device 1 302 in data network 300 with the above exemplary network segment costs, multi-path router instance 2 338 may independently set cost values for interior segments 356 and 358 such that Paths D and E have the same cost, in order to provide load balancing of data traffic between IP applications associated with SPF 2 and IP device 3 306. In order to achieve this goal, the assigned costs may be as follows:

Cost(356)=30; Cost(Path E)=135 and Cost(Path G)=128

Cost(358)=34; Cost(Path F)=135

In another exemplary application of IP device 1 302 in data network 300 with the above network segment costs, multi-path router instance 1 336 may be required by other resources within IP device 1 302 to established a prioritized rank of network interface or path utilization without changing assigned costs for external data network segments. For example, an autonomous system management function within IP device 1 302 may determine that network interface A 340 requires a new software load and can only carry traffic on an emergency basis until the update is complete. Multi-path router instance 1 336 may assign the following cost parameters in order to favor use of network interface B 342 first, followed by network interface C 344, and then reserve network interface A 340 for sparing or overflow traffic only:

Cost(350)=500; Cost(Path A)=573

Cost(352)=10; Cost(Path B)=132

Cost(354)=70; Cost(Path C)=137 and Cost(Path D)=144

In yet another exemplary application of IP device 1 302 in data network 300 with the above network segment costs, multi-path router instance 2 338 may be required by other resources within IP device 1 302 to established a prioritized rank of network interface or path utilization without changing assigned costs for external data network segments. For example, an autonomous system management function within IP device 1 302 may determine that network interface E 348 requires diagnostic testing and should have data traffic temporarily diverted to network interface D 346 until the tests are complete. Multi-path router instance 2 338 may assign the following cost parameters in order to favor use of network interface E 346 first and then reserve network interface F 348 for sparing or overflow traffic only:

Cost(356)=20; Cost(Path E)=125 and Cost(Path G)=118

Cost(358)=1000; Cost(Path F)=1101

Figure 4:
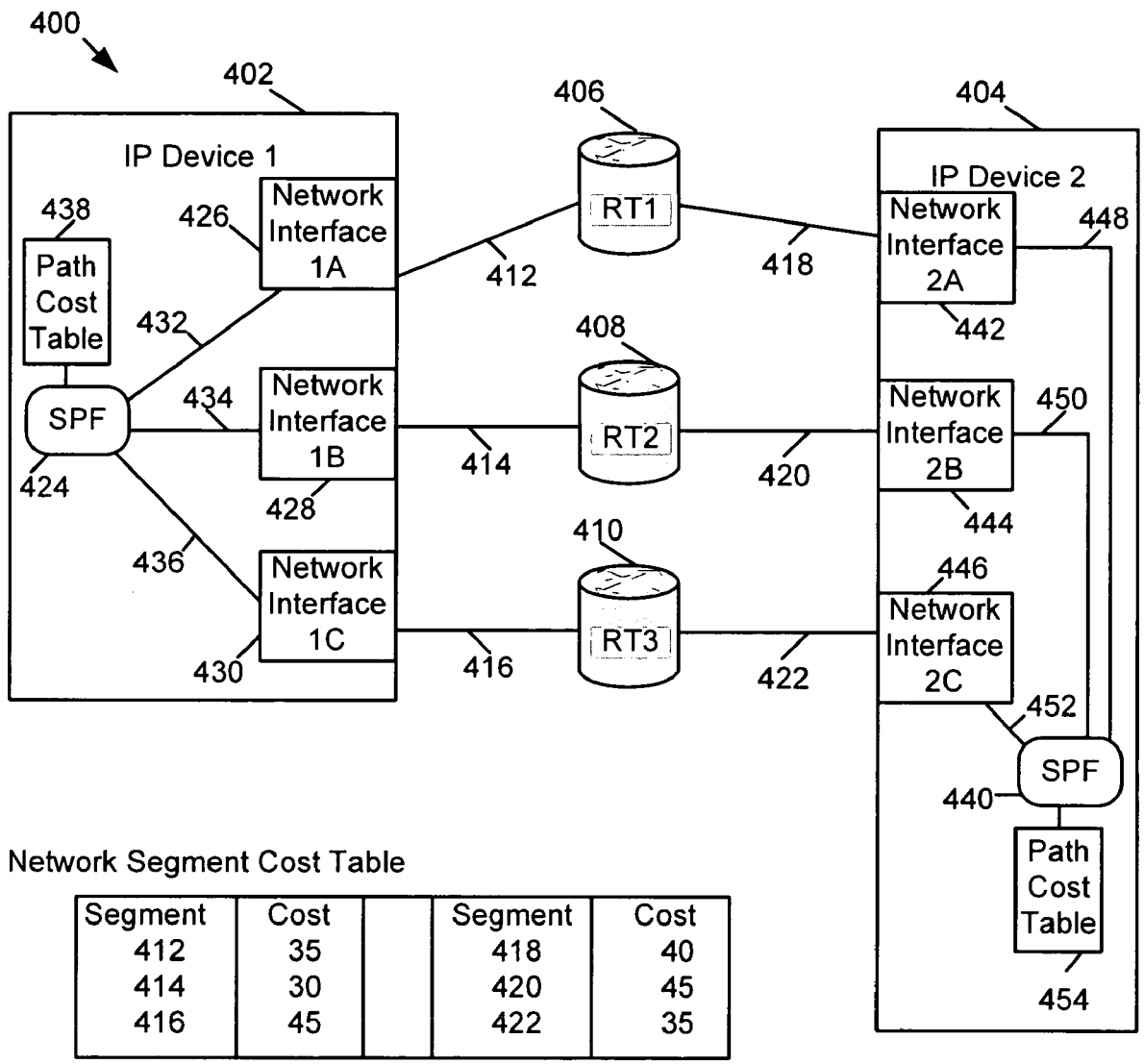
FIG. 4 is a block diagram of an exemplary data network containing two IP devices, each with one multi-path router instance, and multiple data network segments and nodes between the two devices according to an embodiment of the subject matter described herein.

Exemplary Data Network with Plural IP Devices with Multi-Path Calculation Capabilities An IP device with a multi-path router instance according to an embodiment of the subject matter described herein may communicate with other like devices to maintain ranked VoIP path lists to the devices. FIG. 4 illustrates an exemplary data network 400 with IP devices 402 and 404, a plurality of network devices 406, 408, and 410, and a plurality of network segments 412, 414, 416, 418, 420, and 422. IP device 1 402 and IP device 2 404 may serve simultaneously as source and destination IP devices, and each may contain resources to provide functions according to the subject matter described herein. IP device 1 402, IP device 2 404, as well as routers RT1 406, RT2 408, and RT3 410 may all be configured with instances of a SPF algorithm such as OSPF or TE-OSPF. For example, data network 400 may represent two multi-service provisioning platforms supporting a mix of voice, video, and data traffic at a network access point.

In FIG. 4, IP device 1 402 may include multi-path router instance 424, three network interfaces 426, 428, and 430, three interior segments 432, 434, and 436, and a path cost table 438. Similarly, IP device 2 404 may include multi-path SPF router instance 440, three network interfaces 442, 444, and 446, three interior segments 448, 450, and 452, and a path cost table 454.

In an exemplary application, a network administrator may assign the following costs to data network segments 412, 414, 416, 418, 420, and 422, as indicated in FIG. 4, using methods associated with conventional SPF protocols:

Cost(412)=35; Cost(414)=30; Cost(416)=45

Cost(418)=40; Cost(420)=45; Cost(422)=35

Multi-path router instance 424 and multi-path router instance 438 may define three interconnecting network paths and associated cost models, as follows:

Path A: network interface 1A 426::RT1 406::network interface 2A 440

Path B: network interface 1B 428::RT2 408::network interface 2B 442

Path C: network interface 1C 430::RT3 410::network interface 2C 444

$$\text{Cost (Path } A) = \text{Cost}(432) + \text{Cost}(412) + \text{Cost}(418) + \text{Cost}(446)$$
$$= \text{Cost}(432) + 35 + 40 + \text{Cost}(446)$$
$$= \underline{\text{Cost}(432) + \text{Cost}(446) + 75}$$

$$\text{Cost (Path } B) = \text{Cost}(434) + \text{Cost}(414) + \text{Cost}(420) + \text{Cost}(448)$$
$$= \text{Cost}(434) + 30 + 45 + \text{Cost}(448)$$
$$= \underline{\text{Cost}(434) + \text{Cost}(448) + 75}$$

$$\text{Cost (Path } C) = \text{Cost}(436) + \text{Cost}(416) + \text{Cost}(422) + \text{Cost}(450)$$
$$= \text{Cost}(436) + 45 + 35 + \text{Cost}(450)$$
$$= \underline{\text{Cost}(436) + \text{Cost}(450) + 80}$$

In a second exemplary application, the multi-path router instances in IP device 1 402 may autonomously assign costs to interior segments 350, 352, 354, 356, and 358 while maintaining the external network costs identified above. For example, multi-path router instance 424 may autonomously assign costs to IP device 1 402 interior segments 432, 434, and 436, as follows:

Cost(432)=15; Cost(434)=10; Cost(436)=15

Additionally, multi-path router instance 438 may autonomously assign costs to IP device 2 404 interior segments 446, 448, and 450, as follows:

Cost(446)=20; Cost(448)=20; Cost(450)=20

These multi-path router instances may then define the end-to-end cost for each of the three network paths as follows:

$$\text{Cost(Path } A) = \text{Cost(432)} + \text{Cost(412)} + \text{Cost(418)} + \text{Cost(446)}$$
$$= 15 + 35 + 40 + 20 = 110$$

$$\text{Cost(Path } B) = \text{Cost(434)} + \text{Cost(414)} + \text{Cost(420)} + \text{Cost(448)}$$
$$= 10 + 30 + 45 + 20 = 115$$

$$\text{Cost(Path } C) = \text{Cost(436)} + \text{Cost(416)} + \text{Cost(422)} + \text{Cost(450)}$$
$$= 15 + 45 + 35 + 20 = 115$$

Path A represents the preferred path between IP device 1 multi-path router instance 424 and IP device 2 multi-path router instance 438, with paths B and C as alternates in a load-sharing configuration.

In a third exemplary application, IP device 2 404 may have a requirement to stop sending traffic through network interface 2B 444 so that equipment at IP device 2 404 may be replaced or reconfigured. Multi-path router instance 440 may reassign interior segment 450 cost to be 10,000 in order to gracefully shift traffic away from network interface 444. This change of cost assignment may raise the aggregate cost for Path B to 10,085 if the external network does not make any contemporaneous changes to costs assigned to network segments 414 or 420. Since the interior segment costs may be advertised using SPF LSA messages, IP device 1 may update its internal path cost calculations and ranked path list with the change at IP device 2, shifting all data traffic away from Path B before the conventional LSA messages associated with SPF network protocols would provide an indication that network interface 2B 444 has been disabled by IP device 2 404.

Exemplary Media Gateway

Figure 5:
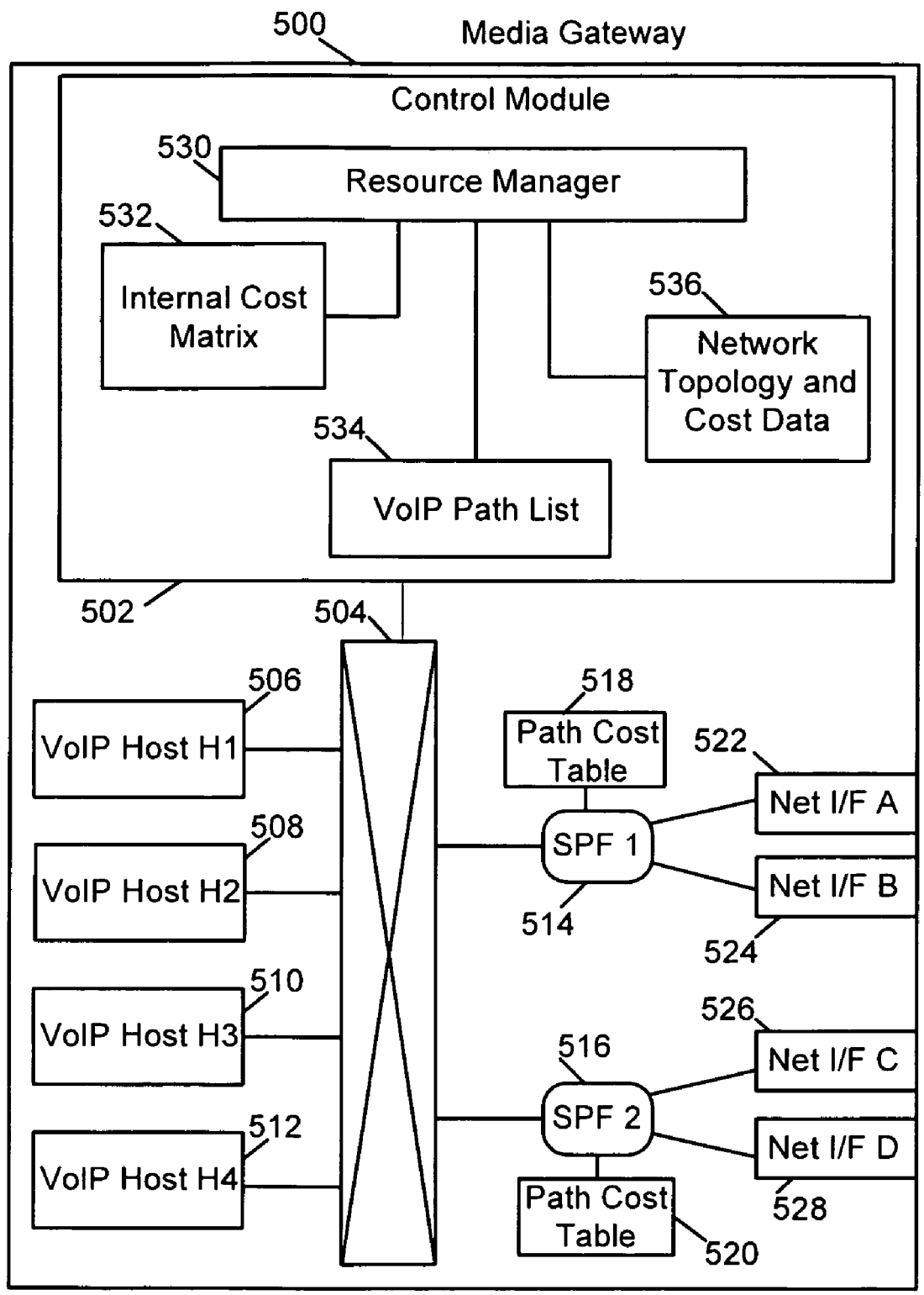
FIG. 5 is a block diagram of an exemplary media gateway containing a control module, VoIP host resources, a switch fabric, two internal multi-path router instances with associated cost tables, and multiple network interfaces according to an embodiment of the subject matter described herein.

In one exemplary implementation, an IP device with a multi-path router instance may comprise a media gateway or other like device for processing media packets, such as VoIP packets. FIG. 5 illustrates an exemplary media gateway having a multi-path router instance according to an embodiment of the subject matter described herein. In FIG. 5, media gateway 500 includes a control module 502, a central switch fabric 504, four VoIP hosts H1 504, H2 506, H3 508, and H4 510, two SPF router instances SPF 1 514 and SPF 2 516 with associated path cost tables 518 and 520, and four network interfaces A 522, B 524, C 526, and D 528.

In FIG. 5, control module 502 may provide overall control and supervision of all resources in media gateway 500, and may comprise resource manager 530, internal cost matrix 532, a global VoIP path list 534, and a global network topology and cost data table 536. Resource manager 530 may allocate new VoIP sessions to incoming packets and update the global network topology and cost data table 536 based on network path information provided by multi-path SPF router instances SPF 1 514 and SPF 2 516. Resource manager 530 may assign VoIP sessions to VoIP network paths stored in the global VoIP path list 534 and to VoIP hosts H1 506, H2 508, H3 510, and H4 512 based on available processing capacity in the VoIP hosts. Internal cost matrix 532 may include internal costs associated with VoIP sessions originating at VoIP hosts H1 506, H2 508, H3 510, and H4 512 and passing through multi-path router instances SPF 1 514 and SPF 2 516 to the external data network through network interfaces A 522, B 524, C 526, and D 528.

Switch fabric 504 may provide connectivity among control module 502, VoIP hosts H1 506, H2 508, H3 510, and H4 512, multi-path SPF router instances SPF 1 514 and SPF 2 516, and other resources in media gateway 500. In one implementation, switch fabric 504 may be an Ethernet switch fabric. In an alternate implementation, switch fabric 504 may be an ATM switch fabric. Although not illustrated in FIG. 5, media gateway 500 may include a plurality of TDM interfaces for interfacing with a TDM network and a TDM switching matrix for connecting the TDM interfaces to VoIP hosts 506, 508, 510, and 512.

VoIP hosts H1 506, H2 508, H3 510, and H4 512 may contain resources for processing VoIP and TDM voice streams. For example, each VoIP host may include codecs, voice over ATM, voice over IP, and TDM components, and digital signal processing resources for processing VoIP streams. Each host may also include resources to implement RTP protocol functions, including datagram creation and control messaging. Each host may also have a unique IP address assigned by media gateway 500.

Multi-path SPF router instances SPF 1 514 and SPF 2 516 and cost tables 518 and 520 may be utilized in media gateway 500 to implement all routing protocol interactions with adjacent SPF nodes in the external data network. Multi-path router instances SPF 1 514 and SPF 2 516 may implement a published protocol utilizing SPF algorithms and methods, such as OSPF and TE-OSPF or may implement a propriety SPF protocol. Multi-path SPF router instances SPF 1 514 and SPF 2 516 may each be associated with multiple network interfaces and implement network path definitions and cost calculations according to the subject matter described herein.

Network interfaces A 522, B 524, C 526, and D 528 may provide standard external interface functions to media gateway 500, including physical termination of network segments to adjacent network nodes. For example, network interfaces 522, 524, 526, and 528 may be IP network interfaces that interface with an external IP network.

In operation, multi-path SPF router instances 514 and 516 may each implement an SPF algorithm multiple times using network interfaces 522, 524, 526, and 528 as SPF nodes to calculate costs for a plurality of paths through network interface 522, 524, 526, and 528 to a destination. Multi-path SPF router instances 514 and 516 may create and maintain a ranked list of IP paths to the destinations based on the calculated costs. Multi-path SPF router instances 514 and 516 may forward traffic over at least one of the paths, such as a lowest cost path. If the lowest-cost path fails, multi-path SPF router instances 514 and 516 may select a new lost cost path and begin using that path for outgoing media packets.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for obtaining a ranked list of paths to a destination IP device across a data network based on path costs, the method comprising:

(a) providing, in a source media gateway for providing an interface between disparate telecommunications networks, a multi-path router instance associated with a plurality of network interfaces in the source media gateway;

(b) assigning a cost to each of a plurality of internal segments within the source media gateway, wherein the internal segments comprise segments between the multi-path router instance within the source media gateway and the network interfaces within the source media gateway associated with the multi-path router instance; and (c) using the multi-path router instance:
  (i) calculating an aggregate cost, including internal and external segment costs, for each of a plurality of traffic paths originating at the multi-path router instance in the source media gateway and extending through each of the network interfaces associated with the multi-path router instance to a destination IP device in the network, wherein external segments comprise segments that are not internal segments;
  (ii) generating a list of the traffic paths and ranking the paths in the list based on the calculated costs;
  (iii) sending traffic from the source media gateway over at least one of the paths in the list; and
  (iv) updating the path costs and rankings in response to segment cost changes.

2. The method of claim 1 wherein providing a multi-path router instance includes providing a multi-path shortest path first (SPF) router instance configured to participate in an SPF protocol.

3. The method of claim 1 wherein assigning a cost to each of a plurality of internal segments includes assigning the costs so that the aggregate costs of the traffic paths are substantially equal.

4. The method of claim 1 wherein assigning a cost to each of a plurality of internal segments includes assigning the costs to direct outgoing packets to or away from at least one of the traffic paths.

5. The method of claim 1 wherein calculating the aggregate path cost for each of a plurality of paths includes using external network path cost information stored in an Open Shortest Path First (OSPF) link state database.

6. The method of claim 1 wherein calculating the aggregate path cost for each of a plurality of paths includes using external network path cost information stored in a Traffic Engineering OSPF (TE-OSPF) link state database.

7. The method of claim 1 wherein sending traffic over at least one of the paths includes sending traffic over a lowest cost path and selecting a path with next lowest cost from the plurality of paths in the event that a failure is reported on the lowest cost path.

8. The method of claim 1 wherein sending traffic over at least one of the paths includes redistributing the traffic among available lowest cost paths using load balancing methods in the event that a failure is reported on one of a plurality of lowest cost paths.

9. The method of claim 1 comprising generating a plurality of ranked path lists using a plurality of multi-path router instances in the source media gateway.

10. The method of claim 1 wherein calculating an aggregate cost for each of a plurality of network traffic paths includes assigning a shortest path first (SPF) node identifier to each of the network interfaces.

11. The method of claim 1 comprising advertising the costs of the internal segments to at least one external network device.

12. A system for obtaining a ranked list of paths from a media gateway to a destination IP device across a data network based on path costs, the system comprising:

a source media gateway for providing an interface between disparate telecommunications networks, the source media gateway including:

(a) a plurality of network interfaces in the source media gateway for sending media packets to and receiving media packets from a network;

(b) a multi-path router instance in the source media gateway associated with the plurality of network interfaces;

(c) a plurality of internal segments within the source media gateway, wherein the internal segments comprise segments between the multi-path router instance and the network interfaces in the source media gateway, each of the internal segments being assigned a cost; and (d) wherein the multi-path router instance is adapted to calculate an aggregate path cost, including internal and external segment costs, wherein external segments comprise segments that are not internal segments, for traffic paths to a destination IP device from the multi-path router instance, through the internal segment within the source media gateway, through each of the network interfaces, to create a list of traffic paths to the destination IP device, to rank the paths in the list based on the costs, and to forward traffic to the destination IP device using at least one of the paths.

13. The system of claim 12 the multi-path router instance comprises a multi-path shortest path first (SPF) router instance configured to participate in a shortest path first protocol.

14. The system of claim 12 wherein each of the plurality of internal segments is assigned a cost such that the aggregate costs of the traffic paths are substantially equal.

15. The system of claim 12 wherein each of the plurality of internal segments is assigned a cost to direct outgoing packets to or away from at least one of the traffic paths.

16. The system of claim 12 wherein the multi-path router instance is adapted to use external network path cost information stored in an Open Shortest Path First (OSPF) link state database in calculating the aggregate path cost for each of the paths.

17. The system of claim 12 wherein the multi-path router instance is adapted to use external network path cost information stored in a Traffic Engineering Open Shortest Path First (TE-SPF) link state database in calculating the aggregate path cost for each of the paths.

18. The system of claim 12 wherein, in sending traffic over at least one of the paths, the multi-path router instance is adapted to send the traffic over a lowest cost path and to select a path with next lowest cost from the plurality of paths in the event that a failure is reported on the lowest cost path.

19. The system of claim 12 wherein, in sending traffic over at least one of the paths, the multi-path router instance is adapted to redistribute the traffic among available lowest cost paths using load balancing methods in the event that a failure is reported on one of a plurality of lowest cost paths.

20. The system of claim 12 comprising generating a plurality of ranked path lists using a plurality of multi-path router instances in the source media gateway.

21. The system of claim 12 wherein, in calculating an aggregate cost for each of a plurality of network traffic paths, the multi-path router instance is adapted to assign a shortest path first (SPF) node identifier to each of the network interfaces.

22. The system of claim 12 wherein the multi-path router instance is adapted to advertise the costs of the internal segments to at least one external network device.

23. A computer program product comprising computer-executable instructions embodied in a computer-readable medium for performing steps comprising:
   (a) providing, in a source media gateway for providing an interface between disparate telecommunications networks, a multi-path router instance associated with a plurality of network interfaces in the source media gateway;
   (b) assigning a cost to each of a plurality of internal segments within the source media gateway, wherein the internal segments comprise segments between the multi-path router instance within the source media gateway and the network interfaces in the source media gateway associated with the multi-path router instance; and
   (c) using the multi-path router instance:
      (i) calculating an aggregate cost, including internal and external segment costs, wherein external segments comprise segments that are not internal segments, for each of a plurality of traffic paths originating at the multi-path router instance in the source media gateway and extending through each of the network interfaces associated with the multi-path router instance to a destination IP device in the network;
      (ii) generating a list of the traffic paths and ranking the paths in the list based on the calculated costs;
      (iii) sending traffic from the source media gateway over at least one of the paths in the list; and
      (iv) updating the path costs and rankings in response to segment cost changes.

24. The computer program product of claim 23 wherein providing a multi-path router instance includes providing a multi-path shortest path first (SPF) router instance configured to participate in a shortest path first protocol.

25. The computer program product of claim 23 wherein assigning a cost to each of a plurality of internal segments includes assigning the costs so that the aggregate costs of the traffic paths are substantially equal.

26. The computer program product of claim 23 wherein assigning a cost to each of a plurality of internal segments includes assigning the costs to direct outgoing packets to or away from at least one of the traffic paths.

27. The computer program product of claim 23 wherein calculating the aggregate path cost for each of a plurality of paths includes using external network path cost information stored in an Open Shortest Path First (OSPF) link state database.

28. The computer program product of claim 23 wherein calculating the aggregate path cost for each of a plurality of paths includes using external network path cost information stored in a Traffic Engineering OSPF (TE-OSPF) link state database.

29. The computer program product of claim 23 wherein sending traffic over at least one of the paths includes sending traffic over a lowest cost path and selecting a path with next lowest cost from the plurality of paths in the event that a failure is reported on the lowest cost path.

30. The computer program product of claim 23 wherein sending traffic over at least one of the paths includes redistributing the traffic among available lowest cost paths using load balancing methods in the event that a failure is reported on one of a plurality of lowest cost paths.

31. The computer program product of claim 23 comprising generating a plurality of ranked path lists using a plurality of multi-path router instances in the source media gateway.

32. The computer program product of claim 23 wherein calculating an aggregate cost for each of a plurality of network traffic paths includes assigning a shortest path first (SPF) node identifier to each of the network interfaces.

33. The computer program product of claim 23 comprising advertising the costs of the internal segments to at least one external network device.

* * * * *